United States Patent [19]
Pelton et al.

[11] 4,296,415
[45] Oct. 20, 1981

[54] METHOD AND APPARATUS FOR REDUCING THE EFFECTS OF SCINTILLATION AND REJECTION OF CLUTTER IN MONOPULSE RADARS

[75] Inventors: Frank M. Pelton, Clarence, N.Y.; Clyde A. Miller, Falls Church, Va.; Thomas F. Leney, Elma, N.Y.

[73] Assignee: Calspan Corporation, Buffalo, N.Y.

[21] Appl. No.: 441,201

[22] Filed: Feb. 6, 1974

[51] Int. Cl.³ ............................................. G01S 13/44
[52] U.S. Cl. ................................. 343/16 M; 343/7 A
[58] Field of Search .......................... 343/7 A, 16 M

[56] References Cited

U.S. PATENT DOCUMENTS

| | | | |
|---|---|---|---|
| 3,283,322 | 11/1966 | Hovda et al. | 343/16 M |
| 3,349,394 | 10/1967 | Carver | 343/16 M |
| 3,599,208 | 8/1971 | Nelson | 343/7 A |
| 3,786,508 | 1/1974 | Orton et al. | 343/7 A |
| 3,801,983 | 4/1974 | Woolley | 343/16 M |

*Primary Examiner*—T. H. Tubbesing

[57] ABSTRACT

A method and apparatus for processing monopulse radar return signals to synthesize the imaginary component ($\beta_I$) of the complex angle of arrival. Scintillation errors in the real component ($\beta_R$) of the complex angle of arrival can then be reduced on a pulse-by-pulse basis by the criterion that $|\beta_I|$ be small in magnitude and gating the $\beta_R$ signal when this criterion is not met.

5 Claims, 2 Drawing Figures

METHOD AND APPARATUS FOR REDUCING THE EFFECTS OF SCINTILLATION AND REJECTION OF CLUTTER IN MONOPULSE RADARS

In a conventional monopulse radar, errors are introduced in the measuring of targets due to scintillation. Angular scintillation is produced whenever the target is other than a point scatterer, i.e., where the target has a spatial extent, particularly under weather conditions of rain and snow. Additionally, since terrain and sea clutter are widely distributed in the azimuth plane, the measured angles of arrival from terrain and sea clutter exhibit considerable scintillation.

The nature of the errors introduced by scintillation depends upon the source of the scintillation. In the case of rain, snow, terrain or sea clutter, return signals from such angularly spread complex targets exhibit extensive scintillation as the target structure is widely distributed. When the target is spatially extended and/or when the target is a part of a spatially extended scattering array, the indicated angle, $\beta_R$ scintillates about the true position of the target.

It is an object of this invention to provide a method for reducing the angular errors due to scintillation.

It is a further object of this invention to provide an improved circuit for reducing the effects of scintillation in a monopulse radar system.

It is a further object of this invention to provide a method and apparatus for rejecting rain and snow in a monopulse radar system.

It is an additional object of this invention to provide a method and apparatus for separating isolated point targets from angularly spread clutter sources.

It is a still further object of this invention to provide a method and apparatus for identifying radio and television towers. These objects, and others as will become apparent hereinafter, are accomplished by the present invention.

In a 2-horn monopulse radar the elevation off-boresight angle, $\beta$, is given by the equation $$\beta = \frac{|\Delta|}{|\Sigma|} \cos \phi,$$

where $\Sigma$ is the vector sum of the signals in the two horns, $\Delta$ is the vector difference of the signals in the two horns and $\phi$ is the vector angle between the $\Sigma$ and $\Delta$ signals at the intermediate frequency. In a 4-horn monopulse radar the elevation off-boresight angle, $\beta$, is given by the equation $$\beta = \frac{|\Delta_{EL}|}{|\Sigma|} \cos \phi_{EL}$$

where $\Sigma$ is the vector sum of signals in the four horns, $\Delta_{EL}$ is the vector sum of the signals in the top two horns minus the vector sum of the signals in the bottom two horns and $\phi_{EL}$ is the vector angle between the $\Sigma$ and $\Delta_{EL}$ signals at the intermediate frequency. Similarly, the azimuth off-boresight angle, $\theta$, of a 4-horn monopulse radar is given by the equation $$\theta = \frac{|\Delta_{AZ}|}{|\Sigma|} \cos \phi_{AZ}.$$

where $\Sigma$ is the vector sum of the signals in the four horns, $\Delta_{AZ}$ is the vector sum of the signals in the horns on the left side minus the vector sum of the signals in the horns on the right side and $\phi_{AZ}$ is the vector angle between the $\Sigma$ and $\Delta_{AZ}$ signals at the intermediate frequency.

Monopulse radar signal processing generally develops the real part of the complex angle of arrival as the indicated angle of arrival of the target being tracked or measured. The complex angle of arrival in the elevation plane, $\beta$, may, for example be written as:

$$\beta = \beta_R + j\beta_I$$

where $\beta_R$ is the real part of the indicated elevation angle to the target and $\beta_I$ is the imaginary part of $\beta$, i.e. the part of the angle $\beta$ which is in phase quadrature. Similarly, the complex angle of arrival of the azimuth plane, $\theta$, may, for example, be written as:

$$\theta = \theta_R + j\theta_I$$

where $\theta_R$ is the real part of the indicated azimuth angle to the target and $\theta_I$ is the imaginary part of $\theta$, i.e. the part of the angle $\theta$ which is in phase quadrature. $\beta_I$ and $\theta_I$ are normally not generated explicitly in monopulse radars even though the information required to generate these signals is available in the radar returns received at the antenna.

If the imaginary component, $\beta_I$, of $\beta$ is synthesized, scintillation errors in $\beta_R$ can be reduced on a pulse-by-pulse basis by the criterion that $|\beta_I|$ be small in magnitude since radar returns from angularly spread targets exhibit large imaginary components of angle of arrival while point targets do not. If on a given pulse $|\beta_I|$ is large, the magnitude of the error between the corresponding (same pulse) $\beta_R$ and the true angular position of the target array is likely to be large as well with the result that the $\beta_R$ data is unreliable. By the practice of the present invention it is possible to sort the received $\beta_R$ data for each and every range cell on a pulse-by-pulse basis so that only the more reliable ($|\beta_I|$ is small) $\beta_R$ data are retained with the less useful ($|\beta_I|$ is large) data gated out. The net result is that the processed data set contains $\beta_R$ measurements that are much more accurate than the raw $\beta_R$ data set received by the monopulse radar.

If, as in a 4-horn monopulse radar, both the imaginary component $\beta_I$ of $\beta$ and the imaginary component $\theta_I$ of $\theta$ are synthesized, scintillation errors in $\beta_R$ and $\theta_R$ can be reduced on a pulse-by-pulse basis by the criterion that $|\beta_I|$ and $|\theta_I|$ be small. If on a given pulse $|\beta_I|$ and/or $|\theta_I|$ is large, the magnitude of the errors between the corresponding (same pulse) $\beta_R$ and/or $\theta_R$ and the true angular position of the target array are likely to be large as well with the result that the $\beta_R$ and/or $\theta_R$ data is unreliable. However, in the case of tall thin structures such as radio and television towers, the $\beta_I$ signal will be generally large and the $\theta_I$ signal will be generally small since the target will be distributed in the elevation plane but will be of little extent in the azimuth plane. Thus, one can "flag" or detect towers by requiring $\beta_I$ to be larger than a preset threshold and $\theta_I$ to be less than a preset threshold, or, more simply, requiring that $\beta_I$ be large and that $\theta_I$ be small.

Basically, the present invention provides a method of and apparatus for reducing rain, sea and land clutter and for reducing errors introduced by scintillation which comprises means for and the steps of processing the radar return signals to obtain a signal representing the real part of the complex angle of arrival, processing the radar return signals to obtain a signal indicative of the imaginary part of the complex angle of arrival and gating the signal representing the real part of the complex angle of arrival when the signal indicative of the corresponding imaginary part of the complex angle of arrival is such as to indicate an unacceptable level of scintillation.

BRIEF DESCRIPTION OF THE DRAWINGS

For a fuller understanding of the present invention reference should now be had to the following detailed description thereof taken in conjunction with the accompanying drawings wherein.

DESCRIPTION OF THE PREFERRED EMBODIMENTS

Figure 1:
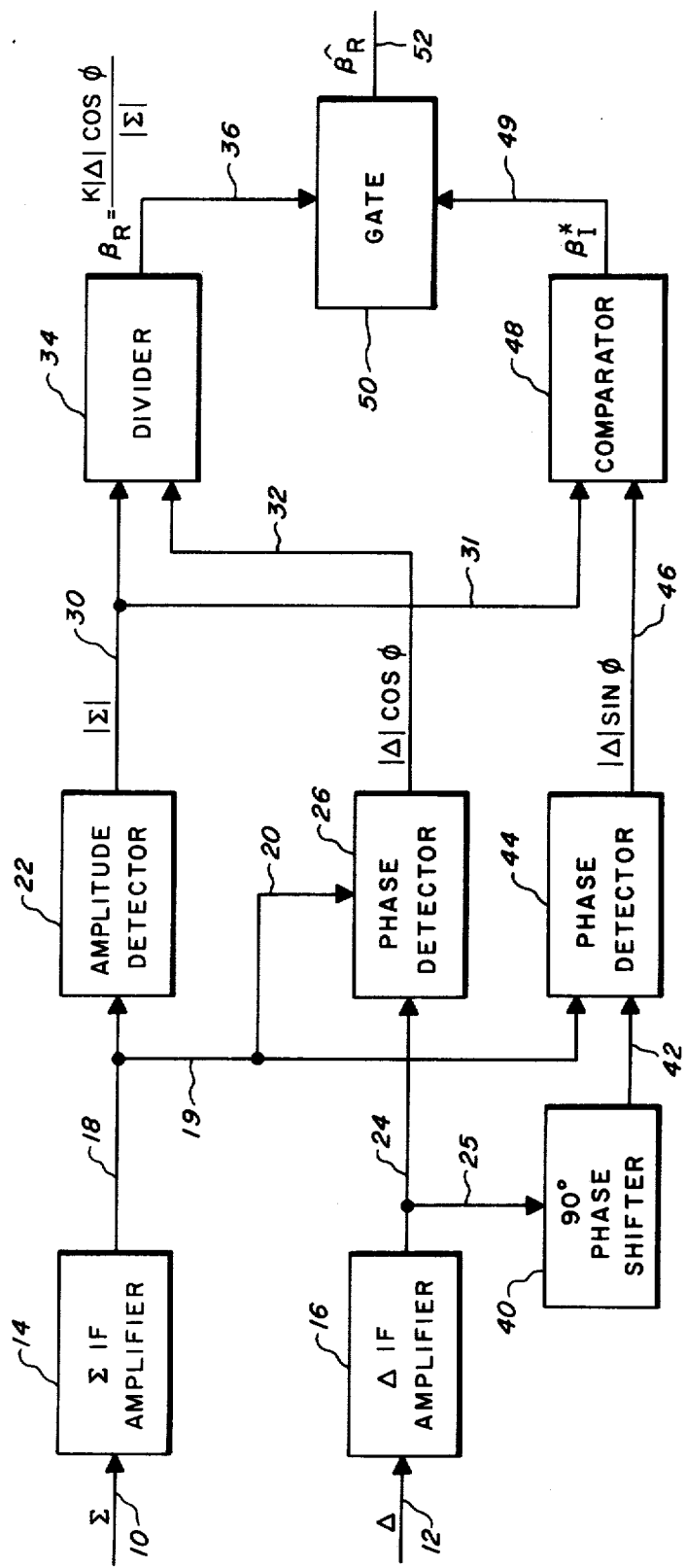
FIG. 1 is a block diagram representation of a circuit for generating a signal indicative of the imaginary part of the complex angle of arrival in a 2-horn monopulse radar system.

In a 2-horn monopulse radar system, as shown in FIG. 1, the signals in the two horns are added vectorially to produce a signal, $\Sigma$, and are subtracted vectorially to produce a signal, $\Delta$. The $\Sigma$ and $\Delta$ signals are obtained from a monopulse (2-channel) receiver (not shown) with the intermediate frequency (IF) $\Sigma$ signal being transmitted via line 10 to a $\Sigma$ IF amplifier 14 and the IF $\Delta$ signal being transmitted via line 12 to a $\Delta$ IF amplifier 16. The amplified output of $\Delta$ IF amplifier 16 is transmitted via line 24 to provide a first input to phase detector 26. The amplified output of the $\Sigma$ IF amplifier 14 is transmitted via line 18 to amplitude detector 22 and via lines 18, 19 and 20 to provide a second input to phase detector 26. The output of amplitude detector 22, $|\Sigma|$, is transmitted via line 30 as the denominator input of divider 34 and the output of phase detector 26, $|\Delta|\cos\phi$ where $\phi$ is the vector angle between the $\Sigma$ and $\Delta$ signals at the intermediate frequency is transmitted via line 32 as the numerator input of divider 34. The output of the divider 34, $$\beta_R = \frac{K|\Delta|\cos\phi}{|\Sigma|},$$

where K is a scaling constant, is transmitted via line 36 and represents the indicated elevation angle conventionally used.

The conventionally employed raw data represented by $\beta_R$ may be processed to reduce the effects of scintillation so as to produce a more accurate target location and to reject clutter from angularly spread targets. The output of $\Delta$ IF amplifier 16 is transmitted via lines 24 and 25 to 90° phase shifter 40. The output of 90° phase shifter 40 is transmitted via line 42 to provide a first input to phase detector 44 and the output of $\Sigma$ IF amplifier 14 is transmitted via lines 18 and 19 to provide a second input to phase detector 44. The output of phase detector 44, $|\Delta|\sin\phi$ is transmitted via line 46 to provide a first input to comparator 48 and the output of amplitude detector 22, $|\Sigma|$ is transmitted via lines 30 and 31 to provide a second input to comparator 48. The output of divider 34, $\beta_R$, is transmitted via line 36 to provide a first input to on-off gate 50 and the output of comparator 48, $\beta_I^*$ (a logical gate signal, 1 or 0) which is indicative of the magnitude of the imaginary part of the complex angle of arrival, is transmitted via line 49 to provide a second input to on-off gate 50. On-off gate 50 is in the "on" position when $\beta_I \leq K_{\beta I}$ where $K_{\beta I}$ is a value representing an acceptable degree of scintillation, and on-off gate 50 is in the "off" position when $\beta_I > K_{\beta I}$. $\beta_R$ is the gated, improved output of on-off gate 50 and is delivered via line 52 to signal processing devices (not shown).

Figure 2:
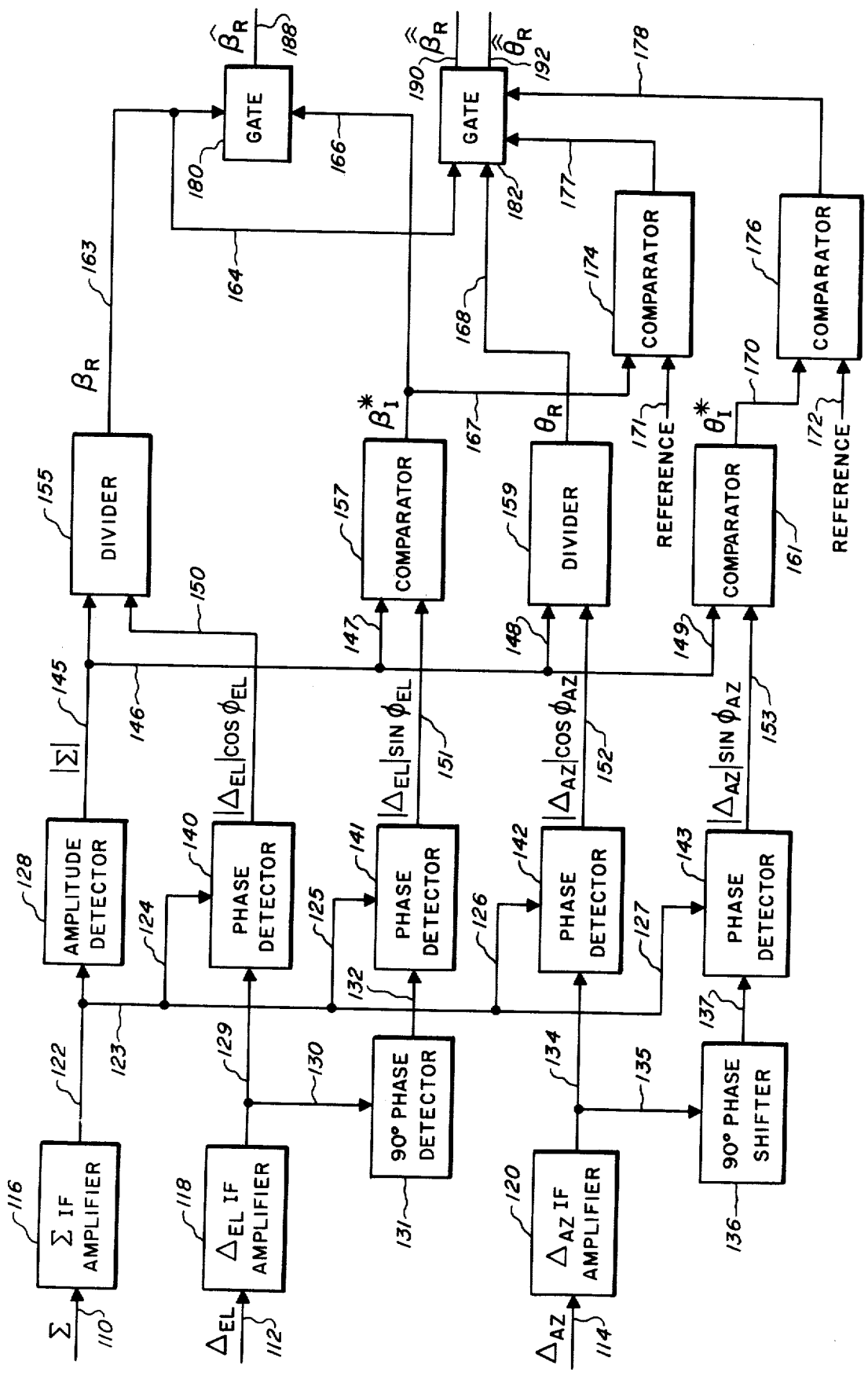
FIG. 2 is a block diagram representation of a circuit for generating a signal indicative of the imaginary part of the complex angle of arrival in a 4-horn monopulse radar system.

In a 4-horn monopulse radar system, as shown in FIG. 2, the signals in the four horns are added vectorially to produce a signal, $\Sigma$, and the vector difference in the azimuth and elevation planes are each added to produce signals, $\Delta_{AZ}$ and $\Delta_{EL}$, representing the vector differences in the azimuth and elevation planes, respectively. The $\Sigma$, $\Delta_{EL}$ and $\Delta_{AZ}$ signals are obtained from a monopulse (4-channel) receiver (not shown) with the intermediate frequency (IF)$\Sigma$ signal being transmitted via line 110 to a $\Sigma$ IF amplifier 116, the IF $\Delta_{EL}$ signal being transmitted via line 112 to $\Delta_{EL}$IF amplifier 118, and the IF $\Delta_{AZ}$ signal being transmitted via line 114 to $\Delta_{AZ}$IF amplifier 120. The amplified output of $\Sigma$ IF amplifier 116 is transmitted via line 122 to amplitude detector 128 and via lines 122, 123, 124, 125, 126 and 127 to provide first inputs to phase detectors 140, 141, 142 and 143. The amplified output of $\Delta_{EL}$IF amplifier 118 is transmitted via line 129 to provide a second input to phase detector 140 and via lines 129 and 130 to 90° phase shifter 131. The output of 90° phase shifter 131 is transmitted via line 132 to provide a second input to phase detector 141. The amplified output of $\Delta_{AZ}$IF amplifier 120 is transmitted via line 134 to provide a second input to phase detector 142 and via lines 134 and 135 to 90° phase shifter 136. The output of 90° phase shifter 136 is transmitted via line 137 to provide a second input to phase detector 143. The output of amplitude detector 128, $|\Sigma|$, is transmitted via lines 145, 146 and 148 as the denominator input of dividers 155 and 159 and is transmitted via lines 145, 146, 147 and 149 as a first input to comparators 157 and 161. The output of phase detector 140, $|\Delta_{EL}|\cos\phi_{EL}$ where $\phi_{EL}$ is the vector angle between the $\Sigma$ and $\Delta_{EL}$ signals at the intermediate frequency, is transmitted via line 150 as the numerator input of divider 155. The output of the divider 155, $$\beta_R = \frac{K_\beta|\Delta_{EL}|\cos\phi_{EL}}{|\Sigma|}$$

where $K_\beta$ is a scaling constant, is transmitted via lines 163 and 164 to provide a first input, representing the indicated elevation angle conventionally used, to on-off gates 180 and 182. The output of phase detector 141, $|\Delta_{EL}|\sin\phi_{EL}$ is transmitted via line 151 to provide a second input to comparator 157. The output of comparator 157, $\beta_I^*$, (a logical gate signal, 1 or 0) which is indicative of the magnitude of the imaginary part of the complex elevation angle of arrival, is transmitted via lines 166 and 167 to provide a second input to on-off gate 180 and to provide an input to comparator 174. The output of phase detector 142, $|\Delta_{AZ}|\cos\phi_{AZ}$ where $\phi_{AZ}$ is the vector angle between the $\Sigma$ and $\Delta_{AZ}$ signals at the intermediate frequency, is transmitted via line 152 to provide the numerator input of divider 159. The output of the divider 159, $$\theta_R = \frac{K_\theta |\Delta_{AZ}| \cos \phi_{AZ}}{\Sigma}$$

where $K_\theta$ is a scaling constant, is transmitted via line 168 to provide a second input, to on-off gate 182. The output of phase detector 143, $|\Delta_{AZ}| \sin \phi_{AZ}$, is transmitted via line 153 to provide a second input to comparator 161. The output of comparator 161, $\theta_I^*$, (a logical gate signal, 1 or 0) which is indicative of the magnitude of the imaginary part of the complex azimuth angle of arrival, is transmitted via line 170 to provide an input to comparator 176. A reference signal is supplied to comparator 174 via line 171 and the output of the comparator 174 is supplied via line 177 as a third input to gate 182. Similarly, a reference signal is supplied to comparator 176 via line 172 and the output of the comparator 176 is supplied via line 178 as a fourth input to gate 182. The gating criteria for gate 182 can be varied depending upon the requirements. To flag a tower, the $\beta_R$ and $\theta_R$ data which is the gated, improved output of gate 182 delivered via lines 190 and 192, respectively, to signal processing devices (not shown), would be passed through gate 182 only if $\beta_I \geq K_{\beta I}$ and $\theta_I \leq K_{\theta I}$. If, however, one wishes to reject signals from rain or snow, the requirements would be that $\beta_I \leq K_{\beta I}$ and that $\theta_I \leq K_{\theta I}$. To reduce the scintillation from terrain returns one would require that $\beta_I \leq K_{\beta I}$ and no $\theta_I$ gating. To select point targets in clutter one would require that $\beta_I \leq K_{\beta I}$ and that $\theta_I \leq K_{\theta I}$ which are the same requirements as for rain or snow rejection.

Although preferred embodiments of the present invention have been illustrated and described, other changes will occur to those skilled in the art. As an example, instead of gating the $\beta_R$ data based upon the $\beta_I^*$ signal, one could also perform a statistical analysis of the $\beta_I$ signal (such as mean $\sigma$ etc.) to decide if the radar returns are in error or from angularly spread clutter targets. Also, modifications may be made in the circuitry as by replacing comparator 48 with a divider. It is therefore intended that the scope of the present invention is to be limited only by the scope of the appended claims.

We claim:

1. A method for processing radar return signals in a four horn monopulse radar system for reducing rain, sea and land clutter, for reducing errors due to scintillation and for identifying tall, narrow structures having a much greater angular extent in the elevation plane than in the azimuth plane including the steps of:

processing the radar return signals to obtain signals representing the real part of the complex angle of arrival in the elevation and azimuth planes;

applying a first set of thresholds and processing the radar return signals to obtain signals indicative of the imaginary part of the complex angle of arrival in the elevation plane;

applying a second set of thresholds and processing the radar return signals to obtain signals indicative of the imaginary part of the complex angle of arrival in the azimuth plane;

processing the signals representing the real part of the complex angle of arrival in response to the thresholded signals indicative of the imaginary part of the complex angle of arrival whereby clutter and errors due to scintillation may be reduced and tall, narrow structures may be identified.

2. The method of claim 1 wherein tall, narrow structures will be identified from the radar return signals when the imaginary part of the complex angle of arrival in the elevation plane is greater than the first set of thresholds and the imaginary part of the complex angle of arrival in the azimuth plane is less than the second set of thresholds.

3. A circuit for processing radar return signals in a four horn monopulse radar system for reducing rain, sea and land clutter, for reducing errors due to scintillation and for identifying tall, narrow structures having a much greater angular extent in the elevation plane than in the azimuth plane including:

means for processing radar return signals to obtain signals representing the real part of the complex angle of arrival;

means for applying threshold levels and for processing radar return signals to obtain thresholded signals indicative of the imaginary part of the complex angle of arrival;

means for processing the signals representing the real part of the complex angle of arrival in response to the thresholded signals indicative of the imaginary part of the complex angle of arrival whereby clutter and errors due to scintillation may be reduced and tall, narrow structures may be identified.

4. A circuit for reducing rain, sea and land clutter and the errors introduced into radar return signals due to scintillation in a two horn monopulse radar system including:

first means for receiving and amplifying a first signal representing the vector sum of the signals in the two horns;

second means for receiving and amplifying a second signal representing the vector difference of the signals in the two horns;

amplitude detector means for receiving the amplified first signal and producing an output signal;

first phase detector means for receiving the amplified first signal as a first input and the amplified second signal as a second input and producing an output signal;

divider means for receiving the output signal of the amplitude detector means as a first input and the output signal of the first phase detector means as a second input and producing a signal representing the real component of the complex angle of arrival;

phase shifting means for receiving as an input the amplified second signal and producing an output signal;

second phase detector means for receiving as a first input the amplified first signal and as a second input the output signal of the phase shifting means and for producing an output signal;

means for receiving the output signal of the amplitude detector as a first input and the output of the second phase detector and as a second input and for producing an output signal indicative of the imaginary component of the complex angle of arrival;

gating means for gating the signal representing the real component of the complex angle of arrival in response to the signal indicative of the corresponding imaginary component of the complex angle of arrival whereby each and every range cell of the received real part of the complex angle of arrival is sorted on a pulse-by-pulse basis so that only the more reliable data is retained which results in the producing of a more accurate target location and the reduction of clutter returns from angularly spread complex targets.

5. A circuit for processing radar return signals in a four horn monopulse radar system for reducing rain, sea and land clutter, for reducing errors due to scintillation and for identifying tall, narrow structures having a much greater angular extent in the elevation plane than in the azimuth plane including:

first means for receiving and amplifying a first signal representing the vector sum of the signals in the four horns;

second means for receiving and amplifying a second signal representing the vector difference in the elevation plane;

third means for receiving and amplifying a third signal representing the vector difference in the azimuth plane;

amplitude detector means for receiving the amplified first signal and producing an output signal;

first phase detector means for receiving the amplified first signal as a first input and the amplified second signal as a second input and producing an output signal;

first divider means for receiving the output signal of the amplitude detector means as a first input and the output signal of the first phase detector means as a second input and producing a signal representing the real component of the complex angle of arrival in the elevation plane;

first phase shifting means for receiving as an input the amplified second signal and producing an output signal;

second phase detector means for receiving as a first input the amplified first signal and as a second input the output signal of the first phase shifting means and for producing an output signal;

third phase detector means for receiving as a first input the amplified first signal and the amplified third signal as a second input and producing an output signal;

second phase shifting means for receiving as an input the amplified third signal and producing an output signal;

fourth phase detector means for receiving as a first input the amplified first signal and as a second input the output signal of the second phase shifting means and for producing an output signal;

second divider means for receiving the output signal of the amplitude detector means as a first input and the output signal of the third phase detector means as a second input and producing a signal representing the real component of the complex angle of arrival in the azimuth plane;

first comparator means for receiving the output signal of the amplitude detector means as a first input and the output signal of the second phase detector means as a second input and producing an output signal indicative of the imaginary component of the complex angle of arrival in the elevation plane;

second comparator means for receiving the output signal of the amplitude detector means as a first input and the output signal of the fourth phase detector means as a second input and producing an output signal indicative of the imaginary component of the complex angle of arrival in the azimuth plane; and means for processing the output signals of the first and second divider means responsive to the output signals of the first and second comparator means whereby clutter and errors due to scintillation may be reduced and tall, narrow structures may be identified.

* * * * *